United States Patent
Uezu et al.

(10) Patent No.: US 7,194,360 B2
(45) Date of Patent: Mar. 20, 2007

(54) METHOD OF DETERMINING RADIOACTIVE NUCLIDES

(75) Inventors: Yasuhiro Uezu, Naka-gun (JP); Tetsuo Hashimoto, Niigata (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 448 days.

(21) Appl. No.: 10/667,448

(22) Filed: Sep. 23, 2003

(65) Prior Publication Data
US 2004/0064289 A1 Apr. 1, 2004

Related U.S. Application Data

(63) Continuation of application No. 09/866,776, filed on May 30, 2001, now abandoned.

(30) Foreign Application Priority Data

Dec. 25, 2000 (JP) .............................. 2000-392010

(51) Int. Cl.
- *G01B 5/25* (2006.01)
- *G01B 5/30* (2006.01)
- *G06F 19/00* (2006.01)
- *A16K 51/00* (2006.01)
- *A16M 36/14* (2006.01)

(52) U.S. Cl. .......................... 702/28; 436/57; 436/58; 422/159; 702/8; 702/40; 702/127; 702/172; 250/370.02; 250/302; 250/252.1; 250/336.1; 424/1.11; 424/1.61; 424/1.65; 424/1.69; 424/1.73; 424/1.77; 424/1.81; 424/1.85; 424/1.89

(58) Field of Classification Search ................. 436/57, 436/58; 422/159; 702/8, 40, 127, 172, 28; 424/1.11–1.89
See application file for complete search history.

(56) References Cited

U.S. PATENT DOCUMENTS
3,805,070 A * 4/1974 Auxier et al. ................ 250/328

(Continued)

OTHER PUBLICATIONS

T. Hashimoto and T. Kubota, "Selective Determination of Thorium Series Nuclides, Ra-224 and Th-228, in Tamagawa Hot Spring Waters Using Time Interval Analysis Method", *Radioisotopes*, vol. 31, No. 10, 414-420 (1989).

*Primary Examiner*—Brian Sines
(74) *Attorney, Agent, or Firm*—Wenderoth, Lind & Ponack, L.L.P.

(57) ABSTRACT

A method of simply and quickly determining α-ray releasing nuclides having long half-life without carrying out a chemical separation is provided.

By inputting a data of pulses incident to an α-ray detector in a computer, obtaining time distribution of the incident pulses by using a very short time measuring timer and plotting, and fitting the linear originated in a random event corresponding to the background and the non-linear originated in the correlated events of parent nuclides-progenies by using the least squares method, the whole generating probability P (t) from the parent nuclide to the progeny thereof is obtained. By subtracting the random events portion from the P(t), the correlated events portion is extracted. The radioactivity per unit can be obtained by dividing the extracted correlated events portion by the measured time, the amount of the supplied sample and the counting efficiency. Also, by determining nuclides unnecessary for the measurement by this method and removing the determined nuclides from the energy spectra of objective nuclides to thereby lower the background, the objective nuclides can be determined by using pulse-height discrimination.

3 Claims, 2 Drawing Sheets

U.S. PATENT DOCUMENTS

| | | | |
|---|---|---|---|
| 4,151,412 A * | 4/1979 | Aime et al. | 250/328 |
| 4,497,768 A * | 2/1985 | Caldwell et al. | 376/153 |
| 4,540,883 A | 9/1985 | Randall | 250/262 |
| 4,591,720 A * | 5/1986 | Fuji et al. | 250/362 |
| 5,210,419 A | 5/1993 | Buheitel | 250/362 |
| 5,235,190 A * | 8/1993 | Tucker et al. | 250/435 |

* cited by examiner

METHOD OF DETERMINING RADIOACTIVE NUCLIDES

This application is a continuation of Ser. No. 09/866,776 filed May 30, 2001, now abandoned.

BACKGROUND OF THE INVENTION

The present invention relates to a method of determining radioactive nuclides by obtaining time interval of pulses incident to an α-ray detector and analyzing it.

In the measurement of radioactivity, pulse-height discrimination of radiations (the energy incident to a radiation detector) is carried out and, by the comparison with a previously prepared energy library, the identification of a radioactive nuclide is carried out. However, under the environment wherein plural radioactive nuclides exist and when the energies of the nuclides are close to each other, they cannot be discriminated, whereby it is necessary to carry out a chemical separation.

For example, when an abnormal-leakage accident occurs in nuclear facilities, there is a possibility that an α-ray releasing nuclide having a long half-life, such as plutonium, etc., contained in the nuclear fuel is released in the environment. Thus, it is necessary to quickly determine plutonium in the suspended dust in the atmosphere. Practically, by sucking the air by a pump, the suspended dust in the air is collected on a filter and after recovering the dust filter, the dust is measured by an α-ray detector (for example, a silicon surface barrier semiconductor detector) and a pulse-height discrimination is carried out.

However, in this case, radon (Rn), polonium (Po), lead (Pb), bismuth (Bi), etc., which are the disintegrated products of uranium (U) and thorium (Th) largely existing in nature are detected as the predominant nuclides and plutonium (Pu) and the like are concealed in the background. Accordingly, it is necessary that, prior to the α-ray measurement by a silicon semiconductor detector, the recovered dust filter is subjected to a pre-treatment in which the dust filter is wholly decomposed with nitric acid and hydrofluoric acid and then plutonium is isolated by an anionic exchange method.

Because such a chemical separation is indispensable in the prior art techniques, a complicated operation is required, and a quick determination cannot be carried out. Incidentally, for the analysis of plutonium in the suspended dust in the atmosphere described above, the time of about one week is required for the determination thereof.

SUMMARY OF THE INVENTION

An object of the invention is to provide a method capable of determining radioactive nuclides having the approximate energies without carrying out a chemical separation.

Another object of the invention is to provide a method capable of simply and quickly determining at a high sensitivity even an α-ray releasing nuclide having a long half-life contained in an environmental sample.

As is conventionally well known, a radioactive nuclide has the half-life specific to the nuclide and, while releasing α-rays and the like, is disintegrated to another nuclide according to the following equation.

$$A = A_o \exp(-\lambda t) = A_o \exp(-\ln(2)/t_{(1/2)}) t)$$

wherein,
A: present radioactivity,
$A_o$: initial radioactivity,
λ: disintegration constant, $\lambda = \ln(2)/t_{(1/2)}$,
$t_{(1/2)}$: half-life,
t: elapsed time.

This shows that, paying attention to the half-life, a half of the parent nuclide A becomes a progeny B within $t_{(1/2)}$ hours. The invention is directed to a method of identifying and determining an objective nuclide without carrying out a chemical separation, by utilizing the principle described above, that is, by detecting the α-rays released at the disintegration of the nuclide by a detector and matching the time distribution thereof with the half-life of the objective nuclide.

According to the present invention, there is provided a method of determining radioactive nuclides comprising:

inputting a data of pulses incident to an α-ray detector in a computer;

obtaining and plotting a time distribution of the incident pulses by using a very short time measuring timer;

obtaining from the plotted time distribution of the incident pulses, the following whole generating probability P(t) dt from a parent nuclide to a disintegrated product thereof by fitting the linear originated in a random event corresponding to the background and the non-linear originated in correlated event of the parent nuclide-disintegrated product by using least squares method $$P(t)dt = \{\alpha_r \cdot \exp(-\lambda t) \cdot \lambda + C\} dt$$

wherein,
P(t)dt: the probability of starting from an optional pulse and expiring at the event within a very short time dt after t milliseconds,
λ dt: the probability of generating the correlated events within a very short time dt after t milliseconds,
C dt: the probability of generating the random events within a very short time dt after t milliseconds,
$\alpha_r$: the probability that the events are caused by the correlated events;

subtracting the random events portion from the P(t) to thereby extract the correlated events portion; and dividing the extracted correlated events portion by the measured time, the amount of supplied sample and the counting efficiency to thereby obtain the radioactivity per unit.

The invention also provides a method of determining radioactive nuclides comprising:

determining nuclides, which are unnecessary for the measurement by the method described in claim 1, on the basis of the half-life thereof and the time intervals of the incident pulses;

removing the thus determined nuclides from the energy spectra of objective nuclides to thereby lower the background and reduce the detection limit value of the objective nuclides; and detecting the objective nuclides by using pulse-height discrimination (energy discrimination).

As described above, by analyzing the time interval of the incident pulses, and extracting the disintegration events, it becomes possible to determine natural radioactive nuclides such as radon, etc. Also, by extracting and subtracting the disintegrated progenies of radon and radium existing in nature from the whole pulses, a background in the analysis of plutonium can be removed. Thus plutonium contained in a suspended dust in the atmosphere can be determined without carrying out a chemical separation.

DETAILED DESCRIPTION OF THE EMBODIMENTS

Figure 1:
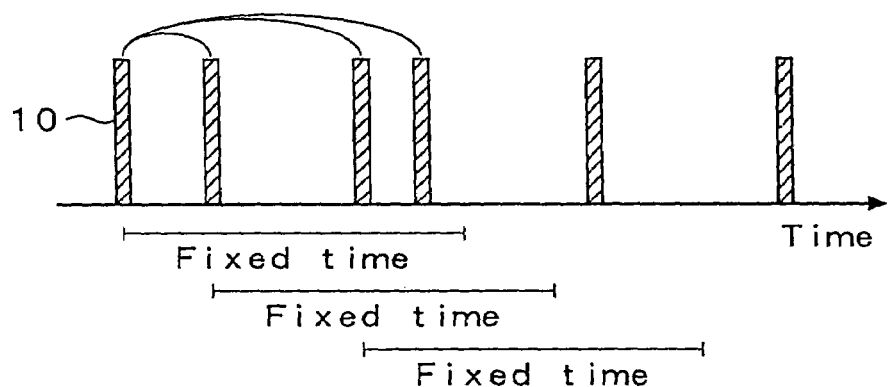
FIG. 1 shows a view explaining the relation of the incident pulses and the fixed time.

Pulses incident in an α-ray detector such as a liquid scintillation detector, a silicon surface barrier detector, etc., are amplified and inputted in a computer through a multi-channel analyzer, and the time distribution of the incident pulses is obtained by using a very short time measuring timer and plotted. Also, a fixed time as shown in FIG. 1 is established and how the incident pulses (shown by a reference number 10) exist in the fixed time is analyzed. The pulses incident in the α-ray detector are classified into those originated in the background and those originated in the correlated event of parent nuclide-disintegrated progenies.

Figure 2:
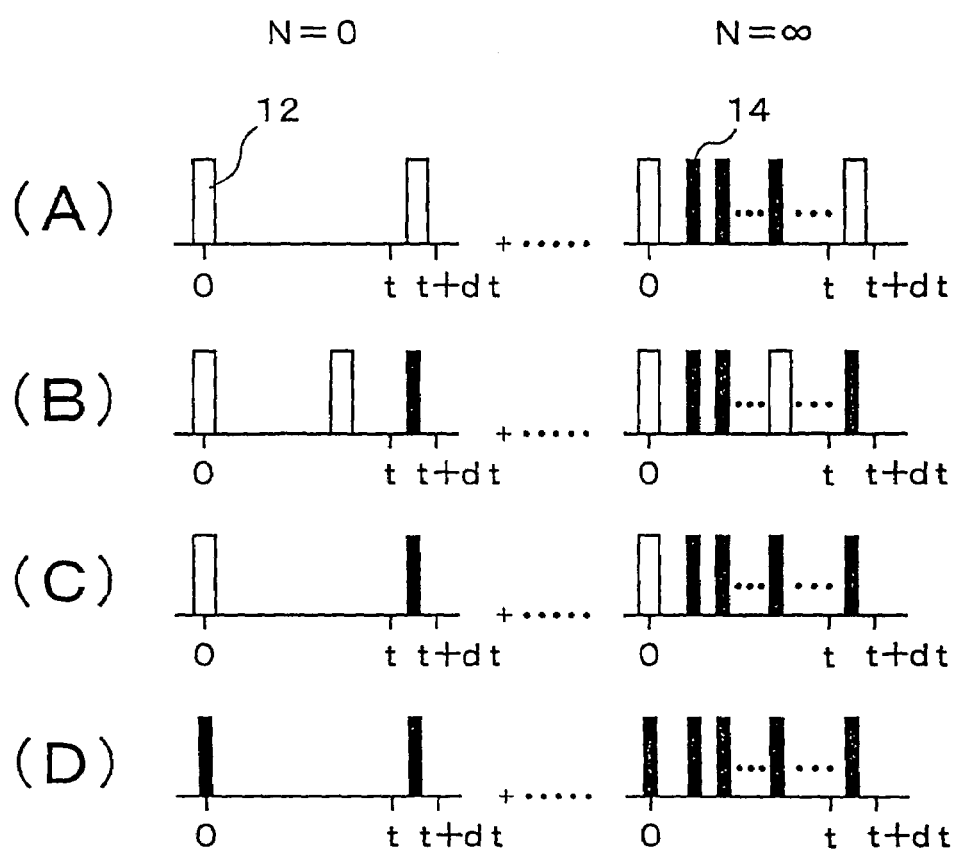
FIG. 2 shows a view showing the pattern of the existing states of the incident pulses in the fixed time.

These pulses are classified into various combinations shown in FIG. 2. In the figure, the pulses (shown by a reference number 12) shown by white show the correlated events and the pulses (shown by a reference number 14) shown by black show the non-correlated (random) events. The probability of each combination is as follows.

$$P_A(t)\,dt = \Sigma \alpha_r \cdot P_b(t) \cdot \exp(-\lambda t) \cdot \lambda dt$$

$$P_B(t)\,dt = \Sigma \alpha_r \cdot P_b(t) \cdot \{1 - \exp(-\lambda t)\} \cdot C\,dt$$

$$P_C(t)\,dt = \Sigma \alpha_r \cdot P_b(t) \cdot \exp(-\lambda t) \cdot C\,dt$$

$$P_D(t)\,dt = \Sigma(1 - \alpha_r) \cdot P_b(t) \cdot C\,dt$$

wherein

P (t) dt: the probability of starting from an optional pulse and expiring at the events within a very short time dt after t milliseconds, $P_b$ (t): the probability of starting from an optional pulse and entering N random pulses after t milliseconds, λ dt: the probability of generating the correlated events within a very short time dt after t milliseconds, C dt: the probability of generating the random events within a very short time dt after t milliseconds, and $\alpha_r$: the probability that the events are caused by the correlated events.

Now, the whole generating probability P (t)dt becomes as follows:

$$P(t) = P_A(t)dt + P_B(t)dt + P_c(t)dt + P_D(t)dt$$

$$= \sum (C \cdot t)^N N! \exp(-Ct) \cdot [\alpha_r \exp(-\lambda t) \cdot \lambda + C]dt$$

and, since the following equation $$(C \cdot t)^N / N! = \exp(Ct)$$

is obtained by the Maclaurin's expansion, the probability of the correlated events from the whole parent nuclides to the disintegrated progenies thereof becomes as follows:

$$P(t)dt = \{\alpha_r \exp(-\lambda t) \cdot \lambda + C\}dt.$$

Figure 3:
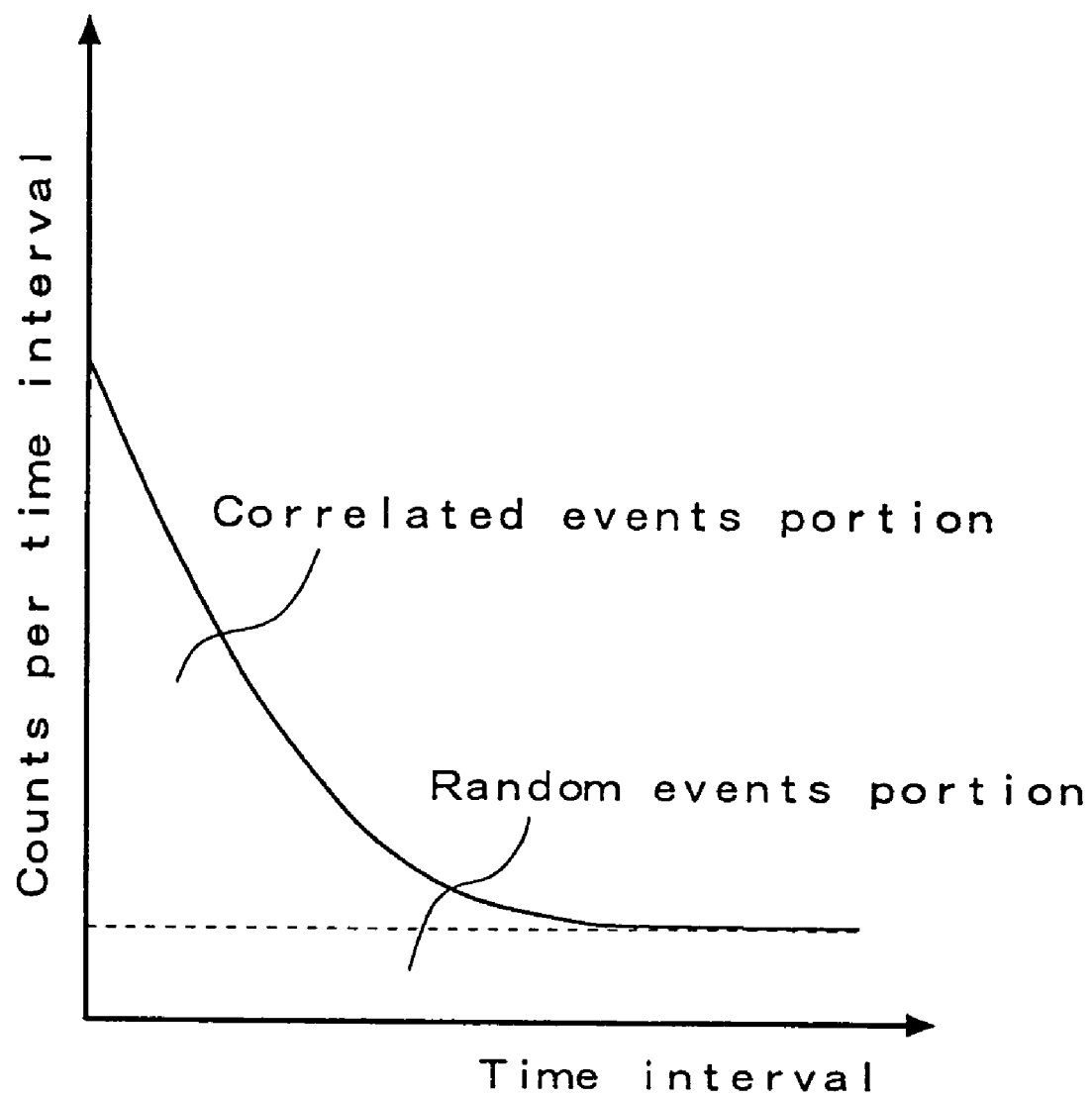
FIG. 3 shows a graph showing the relation of the time interval and counts.

The above equation means that the correlated event portion $\alpha_r \cdot \exp(-\lambda t) \cdot \lambda\,dt$ to be extracted exists on the random events portion (background) of C dt. This state is shown in FIG. 3.

Conversely speaking, as being understood from the foregoing, the P(t)dt is obtained from the time distribution of the plotted incident pulses, by fitting the linear originated in the random events corresponding to the background and the non-linear originated in the correlated events of parent nuclide-disintegrated progenies by using least squares method:

$$P(t)dt = \{\alpha_r \exp(-\lambda t) \cdot \lambda + C\}dt.$$

The random events portion is then subtracted from the P(t) to thereby extract the correlated events portion from the parent nuclide to the disintegrated products thereof.

Now, in the measurement of a radioactive nuclide (radioactivity), the number of incident radiations is counted. For example, when 600 radiations enter during the measuring time of 60 seconds, the number of the radiations corresponds to 10 per second. However, the counting efficiency differs according to a detector (for example, when 40 radiations can be counted in 100 radiations, the counting efficiency becomes 40%). Accordingly, it is necessary to divide the counted number by the counting efficiency. For example, when a detector having the counting efficiency of 40% counts 10 radiations per second, there are 25 radiations per second, in fact. Furthermore, they are the radiations from a sample of 100 g, the number of the radiations becomes 0.25 radiation per gram of the sample.

Therefore, by dividing the correlated events portion extracted as described above by the measured time, the amount of the supplied sample and the counting efficiency, the radioactivity per unit can be obtained (that is, the radioactive nuclide can be determined). By such a time interval analysis method, the radioactive nuclides having half-life of from millisecond to microsecond can be selectively extracted. As the examples thereof, there are $^{220}Rn \rightarrow ^{216}Po \rightarrow$, $^{219}Rn \rightarrow ^{215}Po \rightarrow$, $^{221}Pr \rightarrow ^{217}At \rightarrow$, etc.

Further, by determining nuclides, which are unnecessary for the measurement by the above-described method, on the basis of the half-life thereof and the time interval analysis method of the incident pulses, and by subtracting the thus determined nuclides from the energy spectra of an objective nuclide, the background can be lowered and the detection limit value of the objective nuclide can be reduced. Thus, a nuclide having a long half-life, such as plutonium, etc., can be determined without carrying out a chemical separation.

As described hereinbefore, when an abnormal leakage accident occurs in nuclear facilities, there is a possibility that an α-ray releasing nuclide having a long half-life, such as plutonium, etc., contained in the nuclear fuel is released in the environment. It is therefore necessary to quickly determine plutonium in the suspended dust in the atmosphere. Practically, by sucking the air by a pump, the suspended dust in the air is collected on a filter, and after recovering the dust filter, the dust is measured by an α-ray detector. In this case, Rn, Po, Pb, Bi, etc., which are the progenies of U and Th largely existing in nature are detected as the predominant nuclides and Pu, etc., are concealed in the background. Accordingly, when the time interval analysis is carried out and these natural radioactive nuclides having short half-lives are subtracted, an α-ray releasing nuclide only having a long half-life such as plutonium, etc., can be pulse height-discriminated and the determination of the α-ray releasing nuclide having a long half-life can be carried out. The pulse-height discrimination is conducted by matching the measured energy with the energy library specific to the radioactive nuclide. Thereby, at emergency, plutonium in the suspended dust in the atmosphere can be quickly measured without need of a chemical separation. In addition, by this method, the concentration of plutonium, etc., of a background level is shown in an ordinary time.

Further, since radon, thoron and progenies thereof can be extracted by using the method of the invention, it is possible to prepare, e.g., a survey meter that is not reactive with these nuclides by the application of the invention.

As described above, because the invention utilizes a method of analyzing the time interval of incident pulses from α-ray releasing nuclides, even the nuclides having approximate energies can be determined without carrying out a chemical separation. Also, because in the invention, natural short half-life nuclides can be extracted and removed as background, even α-ray releasing long half-life nuclides can be simply and, quickly determined at a high sensitivity by combining the pulse-height discrimination.

What is claimed is:

1. A method of determining the presence of radioactive nuclides having a long half-life in a sample, without chemical separation of radioactive nuclides having a short half-life from the sample, comprising:

detecting α-rays released from radioactive nuclides in a sample using an α-ray detector over a predetermined time period;

analyzing the detected α-rays by time interval analysis to identify the portion of α-rays released from radioactive nuclides having a short half-life;

subtracting the portion of α-rays released from radioactive nuclides having a short half-life from the detected α-rays to remove background α-rays from the detected α-rays; and analyzing the remaining α-rays by pulse-height discrimination to determine the presence of radioactive nuclides having a long half-life.

2. The method according to claim 1, wherein the α-ray detector detects α-rays as incident pulses and transmits such incident pulses as pulse data to a computer for time interval analysis.

3. The method according to claim 2, wherein the computer analyzes the pulse data and plots a time distribution of the pulse data.

* * * * *